United States Patent [19]

Desbois et al.

[11] Patent Number: 4,747,073

[45] Date of Patent: May 24, 1988

[54] TERMINAL FOR COMMUNICATION WITH A REMOTE DATA PROCESSING SYSTEM

[75] Inventors: Alain Desbois, Benodet; Jean-Claude Palous, Quimper, both of France

[73] Assignee: Matra Communication

[21] Appl. No.: 777,597

[22] Filed: Sep. 19, 1985

[30] Foreign Application Priority Data

Sep. 19, 1984 [FR] France ................ 84 14379

[51] Int. Cl.⁴ ........................... G06F 3/14
[52] U.S. Cl. .................................. 364/900
[58] Field of Search ............. 364/200, 900; 370/110.1; 358/147, 84, 85, 86; 340/825.5, 703, 707

[56] References Cited

U.S. PATENT DOCUMENTS

| | | | |
|---|---|---|---|
| 4,032,899 | 6/1977 | Jenny et al. | 364/200 |
| 4,079,452 | 3/1978 | Larson et al. | 364/200 |
| 4,091,445 | 5/1978 | Ryan | 364/200 |
| 4,365,294 | 12/1982 | Stokken | 364/200 |
| 4,424,572 | 1/1984 | Lorig et al. | 364/900 |
| 4,426,684 | 1/1984 | Sechet et al. | 364/900 |
| 4,512,017 | 4/1985 | Nici et al. | 370/110.1 |
| 4,530,008 | 7/1985 | McVoy | 340/825.56 |

Primary Examiner—Thomas M. Heckler
Attorney, Agent, or Firm—Larson and Taylor

[57] ABSTRACT

A videotext terminal for connection to a telephone carrier is enhanced by an internal bus extension device providing additional ports associated with connector means which can receive anyone of a plurality of different external modules. A resident program stored in the ROM of the terminal includes a module handling protocol arranged for interfacing internal protocols of the terminal with anyone of the external modules and achieving compatibility.

6 Claims, 9 Drawing Sheets

TERMINAL FOR COMMUNICATION WITH A REMOTE DATA PROCESSING SYSTEM

FIELD OF THE INVENTION

The invention relates to terminals for use in remote data processing systems and more specifically to terminals provided for connection to a data transmission network, typically a telephone carrier. It is particularly suitable for use in connection with videotext systems which are widely used at the present time but whose possibilities are limited to displaying on a screen or transferring on a printer information transmitted on the telephone network in response to a request typed by a local operator on a keyboard.

PRIOR ART

There exists videotext terminals which comprise a processing unit, display means (typically a CRT tube), input/output means for connection with the telephone network and memory means storing a resident program, all connected to an internal bus. By way of example, reference may be made to model TTE A315 available from the assignee of the present invention. Since low cost is a requirement, the presently available videotext terminals are "frozen" and it is difficult to adapt them to market developments. They can be considered as constituting a closed system: they cannot accept new functions unless an adaptation study specific to each function is made.

Attempts have however been made to enhance terminals for use in remote data processing systems by providing connector means arranged to receive a pluggable cartridge. In particular, plug-in modules have been made for increasing the memory size of the terminal. Such modules are entirely handled by the internal processor of the original terminal and by software stored in the terminal. The module must be specially adapted to the terminal and the software stored in the terminal must be adapted to identify the module so as to be able to manage it according to its particular features.

Program extension plug-in modules have also been proposed. However, such additional programs are not carried out by the module. They are read from the module and written into the central memory of the terminal before they are performed. That approach has the drawback of relying on a sufficient memory size of the terminal. Finally, in an elaborate version, it has been proposed to connect intelligent modules, including a processor, to a terminal. However, additional computing power is required for dialog between the module processor and the terminal processor.

There further exists minicomputers, particularly personal computers, with a connector for plugging-in a cartridge for emulation. U.S. Pat. No. 4,377,852 (Thompson) discloses a ROM module which may be plugged into a domestic computer for adapting to data tranmission networks. That adaptation again relies on the capabilities of the computer for operation. The prior art is also replete with disclosures of proposals for enhancing computers. Reference may for instance be made to "Extended memory and modularity are added to the series 80 computer family" by J. T. Eaton et al in "Hewlett Packard Journal", Vol. 33, No. 12, December 1982, and to French Patent Application No. 2,530,843 (Departement . . .) .

SUMMARY OF THE INVENTION

It is an object of the invention to emulate a terminal for a remote data processing system by providing the capability to connect external modules which can be handled by the original handling protocol of theterminal with the only constraint that each external module for insertion can be identified by the protocol. The word "module" should not be construed in the limitative sens of a pluggable casing containing read-only memories, but as designating any unit which may be handled as a whole and plugged into a connector with which the terminal is provided.

For that purpose, use has been made of an approach which is applied for interconnecting data processing and remote data processing systems, while relying on hardware and software which are however completely different. More precisely, the approach somewhat parallels that of the seven-layer interconnection ISO model and the attempts for standardization over the highest possible number of layers from the lowest layer.

Using that approach, there is provided an interactive terminal of the above-defined type which further comprises an extension device for extending the internal bus of the terminal to port means associated with connector means arranged to receive any one of a plurality of different external modules. The resident program includes a module management protocol suitable for interfacing with the internal protocols of the terminal. The management protocol achieves compatibility between the external modules and the internal protocols and protects said terminal in case of failure or lack of adaptability of the external module.

The connector, or each connector, is typically placed in a cavity formed in the casing of the terminal, protected by a swinging door, physical connection being via a reduced insertion force connector. The terminal is advantageously provided for receiving two modules each connected to the apparatus by means of a separate connector.

The protocol for handling the external modules is incorporated in a switching monitor of the terminal which allows the terminal to take into account not only the external modules but also internal modules of the terminal. Thus, each external module may dialogue with any internal module or with the other external module. It can also be arranged for replacing not only the hardware but also part of the software of any one of the internal modules. The protocol for handling the external modules provides compatibility between the modules and the terminal and makes it possible to connect an appropriate external module on any one of the open terminals, belonging to different families, equipped with such a monitor.

As indicated above, the protocol for handling the external modules must provide services which are comparable to the first six layers of the ISO standardization, for the purpose of allowing communication at the seventh level (application layer). It is not necessary to describe here the ISO standardization since it is well known. Reference may however be made to documents summing up this standardization, for example to "Protocol standardization works its way up the ladder of the OSI model", ElECTRONICS, June 14, 1984, pp. 148–151.

For implementing the invention, the layers 1 to 6 of the OSI model correspond to the following functions:

Level 1 (physical layer): established on the bus of the terminal, completed by an extension.

Level 2 (link layer): procedure for transferring the information onto this bus.

Level 3 (network layer): routing and placing several peripheral data processing apparatuses in logic relation.

Level 4 (transport layer): safety of the information exchanges.

Level 5 (session layer): negotiation of the different services included in the peripheral logic sub-assemblies.

Level 6 (presentation layer): definition of the formats and protocols for selection of formats by Level 7 (application layer).

With such an arrangement, it becomes possible to interconnect apparatuses having their own intelligence, particularly computer means, or apparatuses having the intelligence of another apparatus, particularly that of the terminal.

The invention will be better understood from the following description which refers to the accompanying drawings.

DESCRIPTION OF AN EMBODIMENT

The invention will now be described as implemented in a videotext terminal of the type available from the assignee of the invention and sold under the name "MINITEL TTE A 315".

Figure 1:
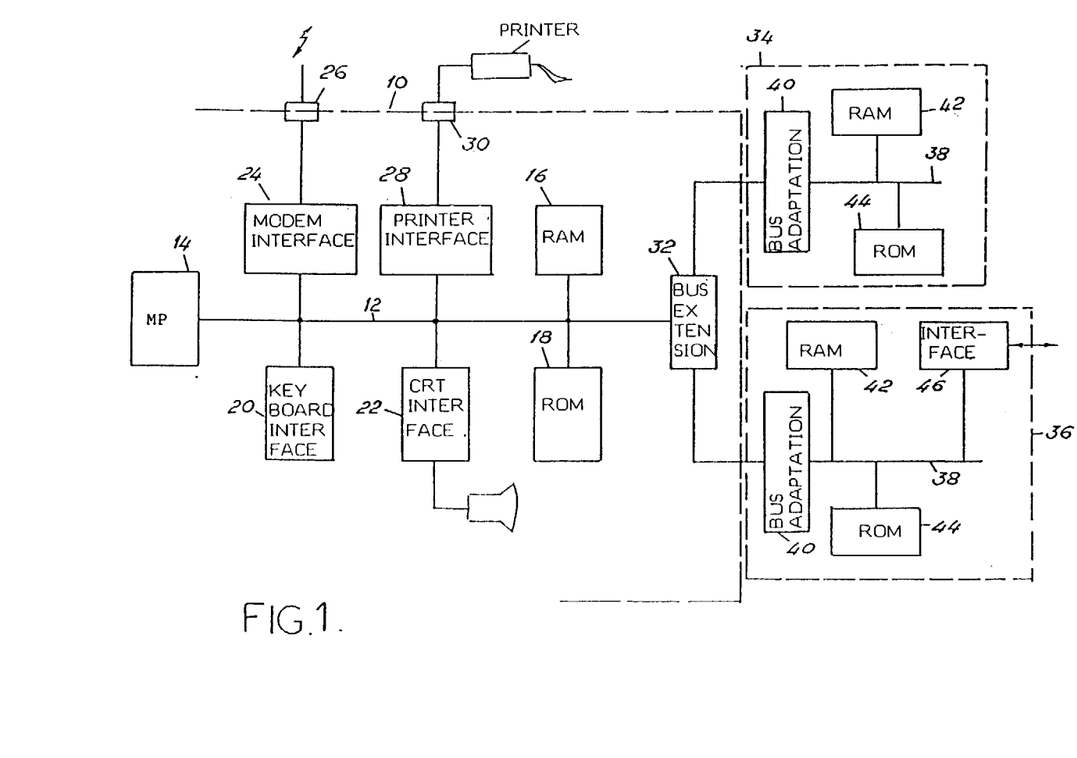
FIG. 1 is a block diagram showing the hardware architecture of a terminal.

Such a terminal has the general hardware construction shown in FIG. 1. The terminal 10 comprises a bus 12 to which a microprocessor 14, interfaces, RAMs 16 and ROMs 18 are connected. As shown, the interfaces comprise a keyboard interface 20, a CRT interface 22, a modem interface 24 for connection with a transmission line through a connector 26 and an interface 28 for connection with a printer through a connector 30. An interface for connection with a local telephone line as well as other interfaces may be provided.

Implementing the invention in a terminal 10 of this type involves minor modifications of the hardware architecture and changes of the software organization.

The architecture must be such that the terminal forms an open or evolutive system capable of receiving external modules corresponding to various functions. For that, the terminal comprises a matching device whose essential part is an extension 32 of bus 12.

As illustrated, extension 32 is provided for allowing the terminal to receive two external modules 34 and 36 at most, which will be called modules 1 and 2, depending on the connector to which they are coupled. Each of the external modules comprises a bus 38 and a circuit 40 for matching the internal bus 12 of the terminal. The external modules may have very varied constructions. Referring to FIG. 1, the external module 1 is formed by a module 34 which comprises only a RAM 42 for data storage and a ROM 44 for program storage. The external module 2 is formed by a module 36 which further comprises an interface 46 for connection with a diskette unit.

The software organisation of the terminal must allow the microprocessor 14 to "see" in the same way that software which is internal to the terminal and the software present in the external modules 1 and 2. This organization must in addition avoid disturbances in operation of the internal software caused by the external software. For that, the internal software must include in addition to that of a "closed" terminal, a protocol for handling the external modules. The protocol has to carry out a plurality of functions. It must:

accept the external modules;

ensure the safety of the terminal in case of conflict or malfunction;

facilitate the routing of information;

interface with the internal protocols of the terminal;

standardize the external modules so as to make them compatible with all the open terminals constructed in accordance with the invention.

Figure 2:
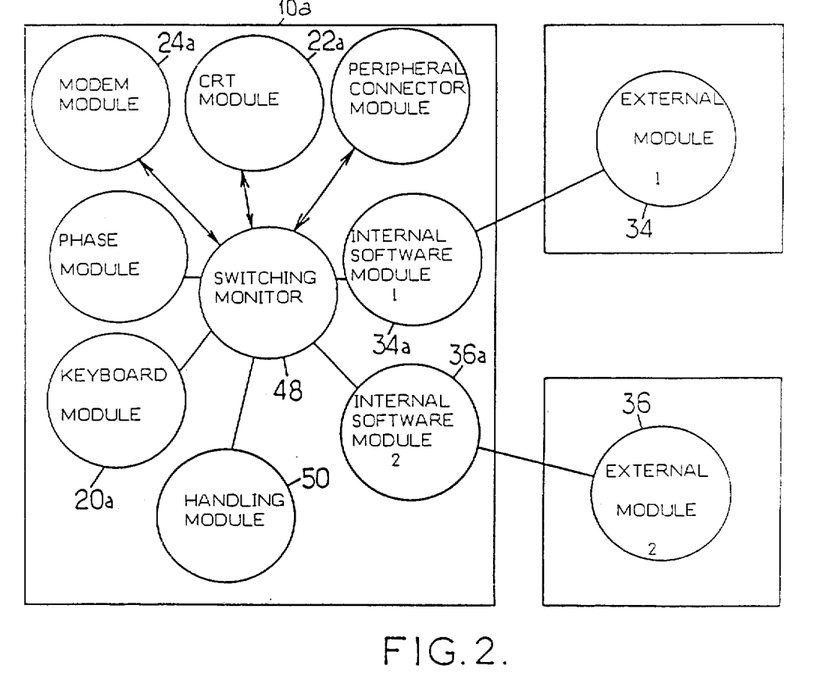
FIG. 2 is a diagram of the switching system of the terminal.

Referring to FIG. 2, the protocol appears in the software organization of the terminal as a switching monitor 48 accepting all modules in accordance with the invention and allowing them to dialogue (or to allow substitution of an external module for an internal module).

The principle applied in the logic structure is to split the physical modules into logic modules each of which may dialogue with any one of the others via the switching monitor 48. However, this reasoning does not necessarily extend to the external modules. Referring to FIG. 2, each of the software modules is designated by the same reference as the corresponding physical module with the index a added thereto. Only the handling module 40 does not correspond to a particular physical entity; it is formed by the application software of the terminal, comprising a list of functions. A single internal software module could also be assigned to the two external modules; the number of modules may moreover be increased beyond two. Then, the internal software mdoule will be used for establishing and breaking off the sessions (communications) between the external modules.

The switching monitor 48 has a switching table storing the different virtual paths to be established between the modules. The table comprises values allowing the system to start up should an initialization abort occur. Subsequently, each module which attempts to dialogue with another module directs a connection establishment request to the routing monitor 48, unless the connection has been previously established. The dialogue can only begin after fulfilment and acknowledgment of the request to the monitor, the first request being directed from the sender to the information receiver.

Each of the external modules suitable for connection to the terminal must comprise a software interface for adapting the application of the external module to the corresponding internal software module of terminal 10. Consequently, each external module must have minimum interface software and an interface table with the internal software module, formed by a table located at a predetermined address which is the same in all external modules. This table allows terminal 10 to identify the external module, to accept it and, if need be, to activate it, as will be described later.

Figure 3:
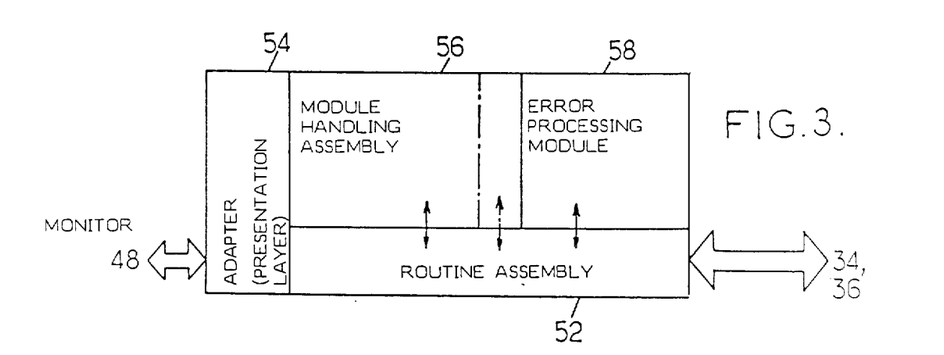
FIG. 3 is an organization diagram of an internal software module of the switching system of FIG. 2.

Each of the internal software modules 34a, 36a may be regarded as formed of three functional sub-assemblies as shown in FIG. 3. If a single internal software module is provided, it comprises in addition a "session" sub-assembly. The purpose of the routing assembly 52 is solely to transmit the information received from one module to another module (addressee) via an adapter 54 (presentation layer). This routing assembly makes use of the module handling assembly 56 when the information received is intended for the internal software module itself and on the software defence assembly (error processing module) 58 for dealing with errors. The purpose of the handling assembly 56 is to enable or disable the associated external module and to accept or reject the external module. The software defence assembly 58 centralizes all error situations and activates the corresponding processing, which may be very varied in nature: it may disregard the error in certain situations, restart terminal 10 in other situations for instance. The purpose of the session assembly when there is a single module is more especially to organize the dialogues and to activate the anticipated application (if need be through the presentation layer). FIG. 3 shows such an additional session sub-assembly in dash dot line.

The protocol for handling the external modules may thus render the modules and the terminal compatible. The protocol as a whole may be regarded as distributed at six levels, the first of which is conventionally formed by the physical connection, each level being able to dialogue with the immediately preceding and following levels. Received information is conveyed upwardly and transmitted information flows downwardly along the levels. Referring to FIGS. 4 to 9, flow of information in the case of reception (that is from level 1 to level 7) is illustrated.

Figure 4:
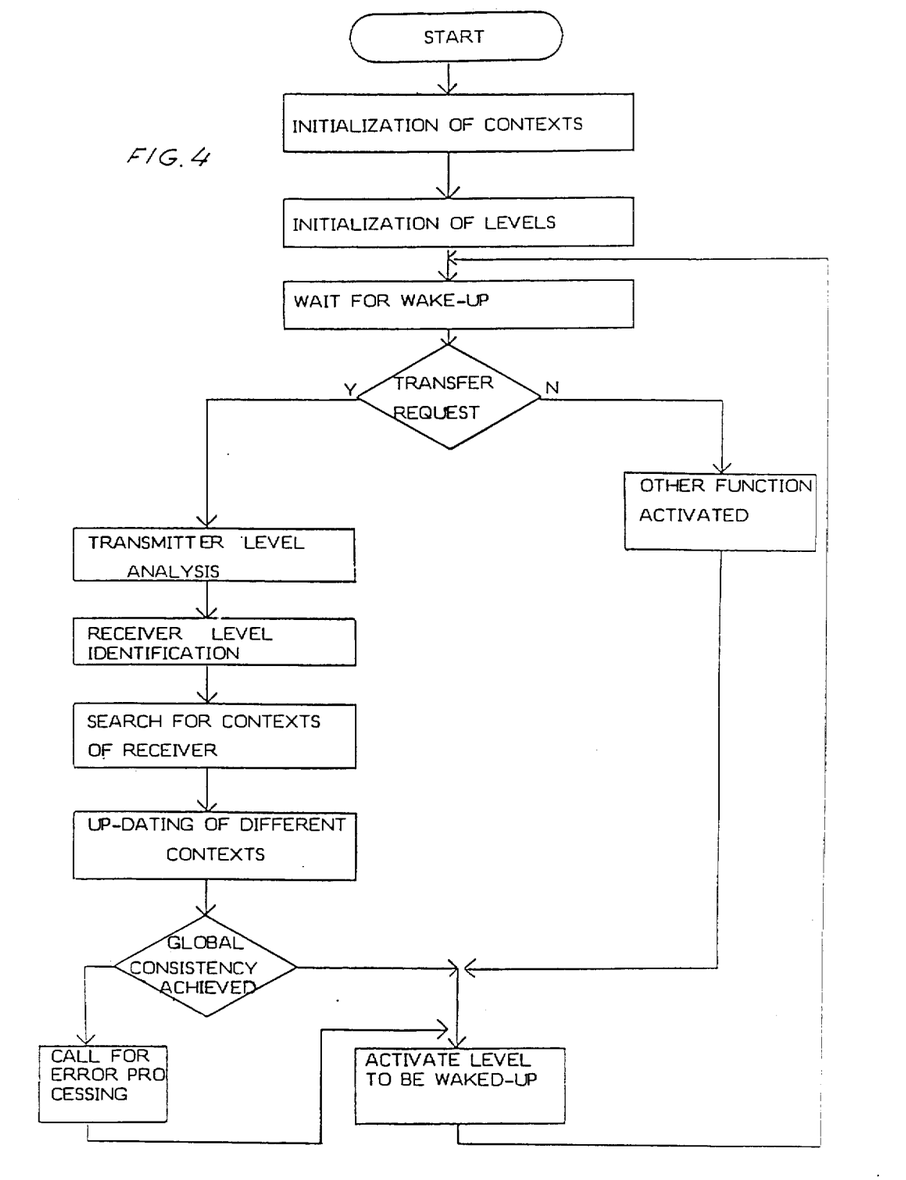
FIG. 4 is a flow chart showing the communication protocol handling.
Figure 5:
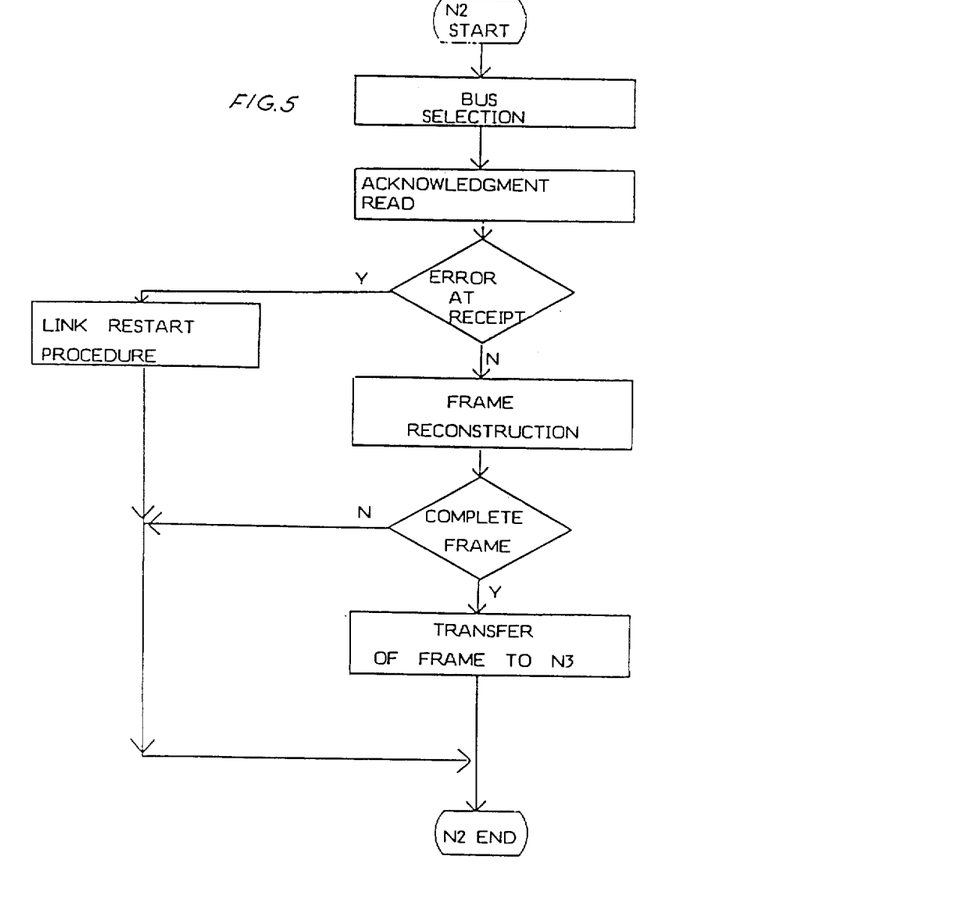
FIGS. 5 to 9 are flow charts showing the operations carried out at the different levels of the communication protocol.
Figure 6:
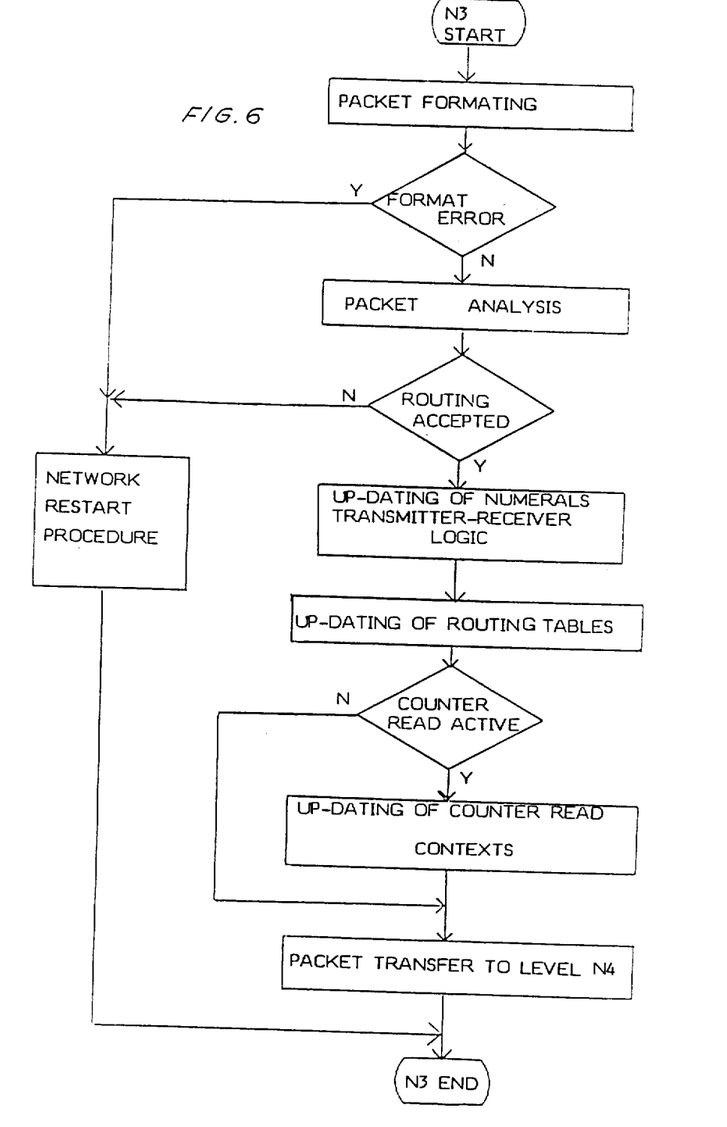
Figure 7:
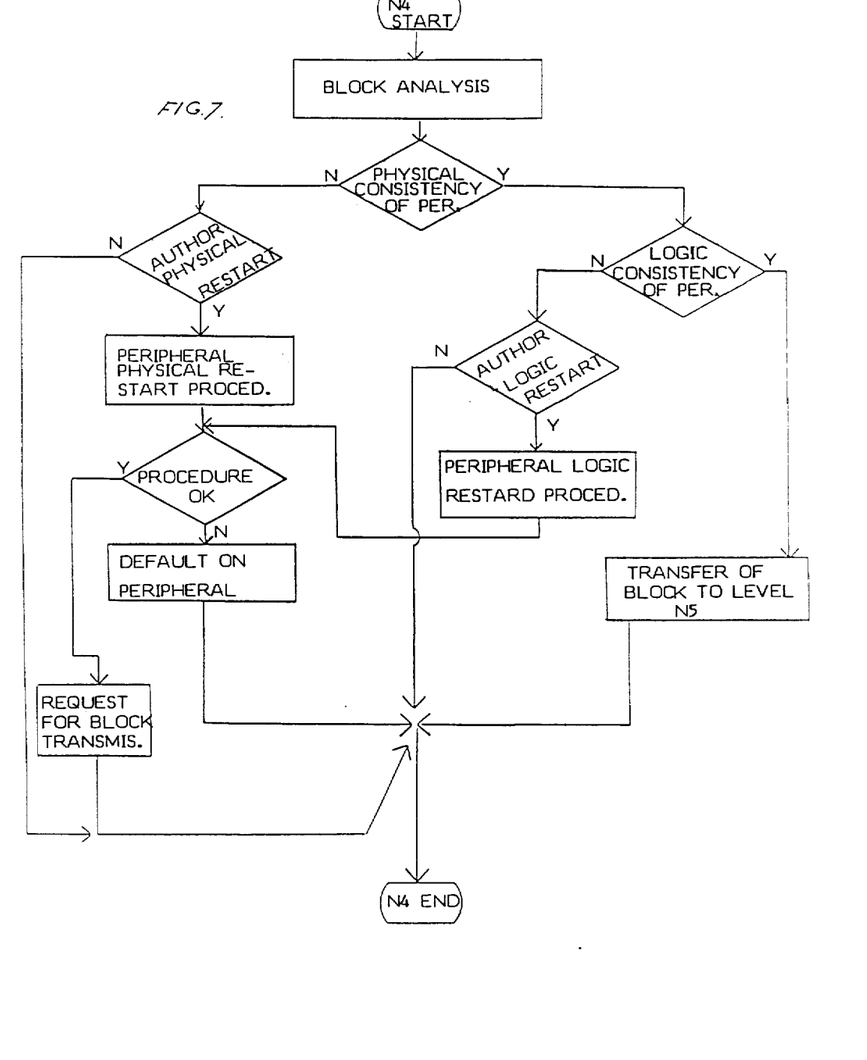
Figure 8:
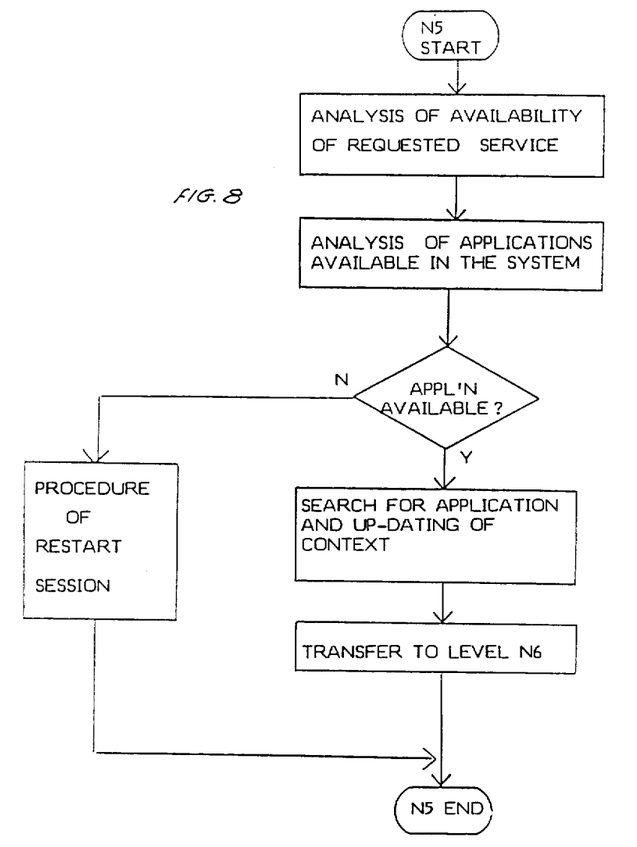
Figure 9:
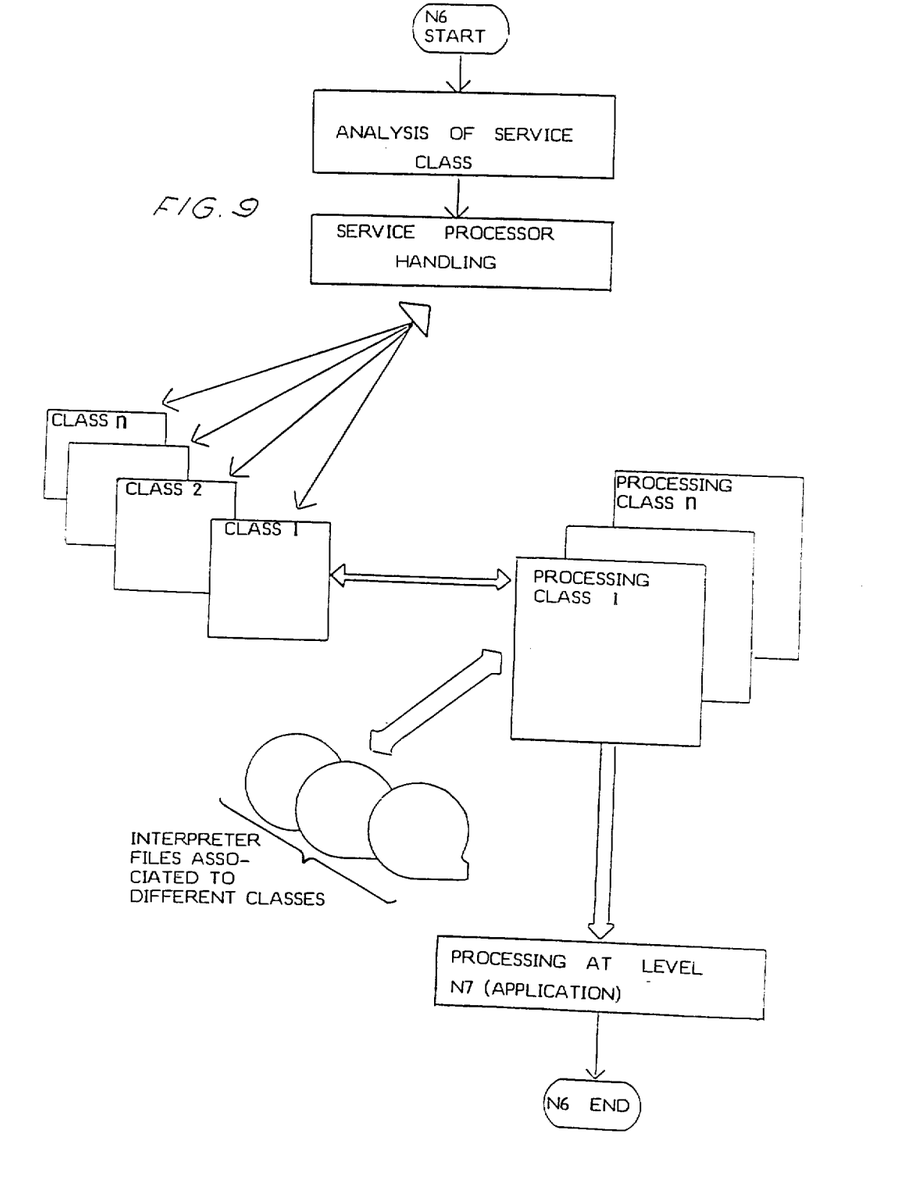

FIG. 4 is a flow chart showing the functions of the basic software whose role is to route and activate the successive levels. FIGS. 5 and 6 show the flow of operations at levels N2 (link) and N3 (network) in the case of information transmission as packets. FIGS. 7 and 8 correspond to levels N4 (transport) and N5 (session) and show functions such as verifications which will be analyzed further on. Finally, FIG. 9 illustrates the operations which occur at level N6 (presentation). These operations consist of an analysis of the required service class and handling of the service flow graph which selects, as a function of the identified class, the appropriate processing before causing execution thereof on the basis of a stored translation file, corresponding to the identified class.

Within this protocol, there will now be described the way in which the external modules are connected, enabled, initialized, used and disabled.

INITIALIZATION OF AN EXTERNAL MODULE

An external module 1 or 2 may be enabled either by an internal command of the module itself or by a command entered by the operator vie the keyboard, or by a command from the system, i.e. from another internal or external module.

The internal software module corresponding to the external module which has been inserted is awaked upon reception of a block requesting operation of the associated external module. Before enabling the external module, the internal software module checks several parameters:

effective presence of the external module: this effective presence may be indicated by information supplied by the connector receiving the external module. Should the external module be absent, the internal software module activates its error processing module 58 (FIG. 3) with the code corresponding to the absence of external module upon initialization;

external module in the disabled condition: a request for enabling an external module cannot be validated unless the module was previously in disabled condition. If such is not the case, there is again a call to the software defence module 58 for issuance of the appropriate code;

selection of start-up permitted automatically, upon an instruction from the system or via the keyboard;

acceptance of the external module by the terminal: for that, a specific logic number is assigned to the terminal and to each external module. The terminal must be arranged for being emulated by the external module only if the latter has a logic number lower than that of the terminal. The logic number of the terminal is contained in a ROM or safeguarded memory which may be modified by a specific exploitation instruction;

acceptance of the external module by the other external module, if the latter is already in place; connection of an with the terminal may be incompatible with an external module already present. This incompatibility or inconsistency may be detected if each external module comprises a type number in its monitor block and an acceptance or refusal mask for other types of external module.

For example, inconsistency exists if one of the external modules is a FORTRAN 4 compiler whereas the other is a BASIC interpreter module. On the other hand, each of these modules could work with an external calendar module.

Verification of the access password if such exists. To reserve the use of an external module for authorized persons, this module may comprise a password in the monitor block stored in a read-only memory or in a safeguarded random access memory. The corresponding internal software module then checks the concordance of the password entered by the operator via the keyboard with the password present in the external module. In case of discrepancy, the error processing module is called.

HANDLING OF THE EXTERNAL MODULE

Once the internal software module 34a or 36a has been initialized, it is transparent while the application is carried out. The external module 34 or 36 may direct a request to the keyboard module 20a for assignment of general purpose function keys for its own exploitation to the CRT module 22a to display messages, etc.

The internal software module only becomes effectively active again if it receives an instruction concerning it, such as a disabling instruction.

DISABLING AN EXTERNAL MODULE

An external module may be disabled by an instruction from the system, by an instruction entered by the operator, by removal of the module or by end of processing, the external module then intervening itself. Disabling must be validated in the same way as enabling.

Figure 10:
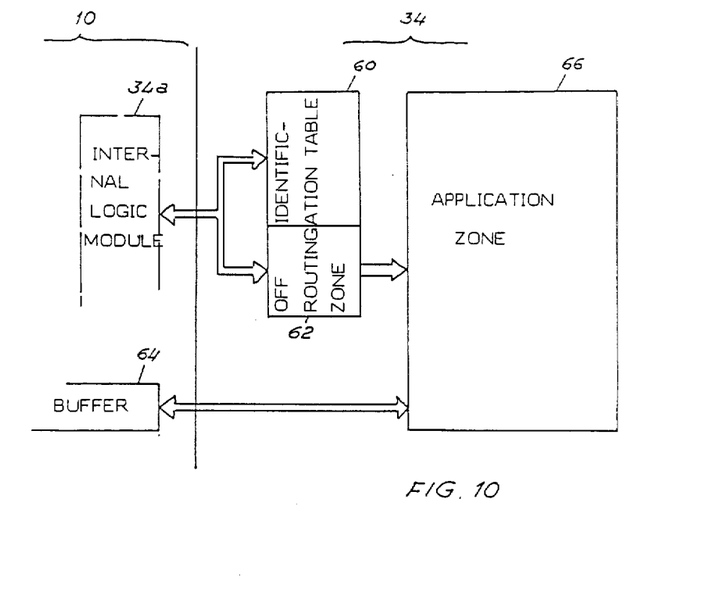
FIG. 10 is an external module organization diagram.

The physical structure of an external module depends more expecially on the application which it supports. However, this module will always comprise at least a non-volatile storage zone (ROM or safeguarded RAM) implanted at a fixed address containing an identification table and a zone of off-routing to the programs. FIG. 10 shows schematically a corresponding arrangement. The identification table 60 implanted at the same address in all the external modules, allows the terminal to recognize the type of module (typically in the form of a cartridge) connected and to detect the possible incompatibility of this cartridge with another cartridge implanted in the terminal. This table may particularly specify a cartridge logic number, an indication of the type and an acceptance/refusal mask.

The diversion zone 62, placed physically at a fixed address and contiguous with the identification table 60, allows the internal software module 34a to activate the initialization, application, enabling and interruption processing of the cartridge.

To allow the flow of information between terminal 10 and the external module 34, two buffers, one operating at reception and the other at transmission, shown at 64 in FIG. 10, are common to the external module 34 and to the internal software module 34a. These buffers are used by the switching module and are specified at a fixed address in the terminal so as to be accessible by the external module.

Finally, the external module contains an application zone 66 which depends directly on the type of application supported. The general structure of all the applications remains nevertheless common so as to allow it to be interfaced with the corresponding internal software module.

The invention is suitable for use with many applications. Some classes of application may be indicated which seem important an may be readily implemented with relatively minor modifications to existing videotext terminals.

Local private application: agenda, games, management program library (such as programs of the kind designated by the trademark "VISICALC") text editor, . . .

Private application in telephone network connected mode: agenda with automatic number, terminal to terminal dialogue through the telephone network, carrier service, credit card.

Application in a firm: dialogue between terminals through a PABX in the firm.

Remote data processing or telematic systems: asynchronous series interfaces, parallel interfaces, adaptation of additional peripherals.

We claim:

1. Videotext terminal for receiving and issuing digital data on a telephone carrier, comprising:
    a processor;
    display means;
    input/output means for connection with said telephone carrier;
    memory means including at least a non-volatile memory containing an operation resident program and a RAM memory;
    an internal bus connected to said processor, display means, input/output means and memory means for carrying data therebetween; and
    connector means connected to said internal bus via bus extension means and arranged to removably receive any one of a plurality of different external modules;
    said resident program including:
    an external module handling protocol arranged for interfacing internal protocols stored in said memory means with any one of said external modules and achieving compatibility therebetween and
    an internal software module operatively connected to said bus extension means, having a routing assembly for transferring information to and from a connected one of said external modules; and a module handling assembly arranged for checking data contained in said connected one of said external modules and having the capability to enable and disable said connected one of said external modules and to accept and reject said connected one of said external modules.

2. Terminal according to claim 1, wherein said terminal has a case defining a receptacle opening to the outside via a swinging door, said receptacle is shaped and sized to receive any one of said external modules and said connector means is located within said receptacle.

3. Videotext terminal according to claim 1, wherein said connector means include at least two connectors each for receiving a separate one of said external modules and wherein said internal software module is arranged for detecting incompatibility between the connected external modules.

4. Videotext terminal according to claim 1, wherein said bus extension means comprises buffer means having a predetermined address and commonly used by said internal software module and the connected external module for storing information transferred between the terminal and the connected external module.

5. Open videotext terminal for receiving and issuing digital data on a telephone carrier, comprising, within a casing:
    a processor;
    display means;
    input/output means for connection with said telephone carrier;
    memory means including at least a non-volatile memory containing an operation resident program and a RAM memory;
    an internal bus connected to said processor, display means, input/output means and memory means for carrying data therebetween; and
    a plurality of connectors each connected to said internal bus via bus extension means and each arranged to receive any one of a plurality of cartridges pluggable from the outside of the casing and constituting external modules;
    said resident program including:
    a switching monitor having a switching table storing all different virtual paths to be established within the terminal;
    an external module handling protocol arranged for interfacing internal protocols stored in said memory means with any one of said external modules and achieving compatibility therebetween; and
    an internal software module operatively connected to said bus extension means, having a routing assembly for transferring information to and from a connected one of said external modules; and a module handling assembly arranged for checking data contained in said connected one of said external modules and having the capability of enable and disable said connected one of said external modules and to accept and reject said connected one of said external modules.

6. Videotext terminal assembly for receiving and issuing digital data on a telephone carrier, comprising:
    a processor;
    display means;

input/output means for connection with said telephone carrier;

memory means including at least a ROM memory containing an operation resident program and a RAM memory;

an internal bus connected to said processor, display means, input/output means and memory means;

connector means operatively connected to said internal bus via bus extension means; and a plurality of different external modules each pluggable into said connector means from the outside of said terminal, all said different modules including a non-volatile storage zone containing an external module identification table having a same address in all said external modules, an off-routing zone having a same address different from the address of the table in all external modules and an application zone programmed to determine functionalities of the external module, said resident program including:

an external module handling protocol arranged for interfacing internal protocols stored in said ROM with any one of appropriate ones of said external modules and achieving compatibility therebetween; and an internal software module operatively connected to said bus extension means, having a routing assembly for transferring information to and from a connected one of said external modules; and a module handling assembly arranged for checking the presence of a connected one of said external modules and data contained therein and having the capability to enable and disable said connected one of said external modules and to accept and reject said connected one of said external modules depending upon the contents of said identification table.

* * * * *